United States Patent
Jung et al.

(10) Patent No.: US 10,061,031 B2
(45) Date of Patent: Aug. 28, 2018

(54) NAVIGATION SYSTEM, PATH PREDICTION METHOD THEREOF AND COMPUTER READABLE MEDIUM FOR PERFORMING THE SAME

(71) Applicants: HYUNDAI MOTOR COMPANY, Seoul (KR); Foundation of Soongsil University-Industry Cooperation, Seoul (KR)

(72) Inventors: Woo Chul Jung, Seoul (KR); Young Woo Choi, Incheon (KR); Je Min Kim, Seoul (KR); Hae Jung Baek, Jeonju-si (KR); Young Taek Park, Seoul (KR)

(73) Assignees: HYUNDAI MOTOR COMPANY, Seoul (KR); Foundation of Soongsil University—Industry Cooperation, Seoul (KR)

( * ) Notice: Subject to any disclaimer, the term of this patent is extended or adjusted under 35 U.S.C. 154(b) by 47 days.

(21) Appl. No.: 14/749,603

(22) Filed: Jun. 24, 2015

(65) Prior Publication Data
US 2016/0178377 A1    Jun. 23, 2016

(30) Foreign Application Priority Data
Dec. 19, 2014   (KR) .......................... 10-2014-0184374

(51) Int. Cl.
    *G01S 19/40*    (2010.01)
    *G01S 19/13*    (2010.01)
    *G01C 21/34*    (2006.01)

(52) U.S. Cl.
    CPC .............. *G01S 19/13* (2013.01); *G01C 21/34* (2013.01); *G01S 19/40* (2013.01)

(58) Field of Classification Search
    CPC .... G01C 21/00; G01C 21/34; G01C 21/3407; G01C 21/3617; G01S 19/13; G01S 19/40
    (Continued)

(56) References Cited

U.S. PATENT DOCUMENTS

2009/0307262 A1*  12/2009  Jeong .................. G06F 17/3087

FOREIGN PATENT DOCUMENTS

JP     2000-155036 A     6/2000
JP     2001-280992 A    10/2001
(Continued)

OTHER PUBLICATIONS

Machine Translation: Lee et al., KR 20100132766, Dec. 2010, Korean Patent Office.*
Lee et al., Trajectory Clustering: A Partition-and-Group Framework, Jun. 2007, Proc. 2007 ACM SIGMOD Int'l Conference on Management of Data.*
Morris et al., Learning Trajectory Patterns by Clustering, 2009, IEEE Conference on Computer Vision and Pattern Recognition.*
Li et al., Incremental Clustering for Trajectories, 2010, DASFAA Conference 2010.*
(Continued)

*Primary Examiner* — Nadeem Odeh
(74) *Attorney, Agent, or Firm* — McDermott Will & Emery LLP (57) ABSTRACT

A navigation terminal includes a path controller configured to identify moving trajectories reaching respective points of interest, to cluster the identified moving trajectories into at least one moving section, to reflect a road correction mechanism in the at least one clustered moving section and to cluster the at least one clustered moving section into at least one moving path, and to extract one moving path, in which time sequential position information received from a GPS is corrected, from the at least one clustered moving path. Thereby, the navigation terminal is resistant to error of a GPS sensor, error generated due to a collection cycle, or error generated in correction, and precisely predicts a moving path.

14 Claims, 5 Drawing Sheets

(58) Field of Classification Search
USPC .................................................. 701/468, 469
See application file for complete search history.

(56) References Cited

FOREIGN PATENT DOCUMENTS

| KR | 10-2001-0026054 A | 4/2001 |
|----|-------------------|--------|
| KR | 10-2008-083823 A | 9/2008 |
| KR | 10-2008-0084504 A | 9/2008 |
| KR | 10-2010-0132766 A | 12/2010 |
| KR | 10-2013-0026258 A | 3/2013 |
| KR | 10-2013-0074153 | 7/2013 |
| KR | 10-2013-0092272 A | 8/2013 |
| WO | WO-2007/103180 A2 | 9/2007 |

OTHER PUBLICATIONS

Wikipedia, Dynamic Time Warping, Oct. 7, 2014, Wikipedia Online Encyclopedia.*
English Translation: Kim et al., "POI Detection and Route Identification for Building Route Models for Smartphone Users", Dec. 2013, Korea Information Science Society Journal of KISS: Software and Applications, vol. 40, No. 12, pp. 799-808 (Year: 2013).*
Li, Q. et. al., "Mining User Similarity Based on Location History," ACM GIS, '08. Irvine, CA. Nov. 5-7, 2008 (2008 ACM ISBN 978-1-60558-323-5/08/11) 10 pages.
Kim, J. et al., "POI Detection and Route Identifiacation for Building Route Models for Smartphone Users", Korea Information Science Society Journal of KISS: Software and Applications; vol. 40, No. 12, 799-808. (with English Abstract).

* cited by examiner

NAVIGATION SYSTEM, PATH PREDICTION METHOD THEREOF AND COMPUTER READABLE MEDIUM FOR PERFORMING THE SAME

CROSS-REFERENCE TO RELATED APPLICATION

This application claims the benefit of Korean Patent Application No. 10-2014-0184374, filed on Dec. 19, 2014 with Korean Intellectual Property Office, the disclosure of which is hereby incorporated by reference as if fully set forth herein.

BACKGROUND OF THE INVENTION

Field of the Invention

The present invention relates to a navigation system, a path prediction method thereof and a computer readable medium for performing the same, and more particularly, to a navigation system which provides a moving path to a mobile object moving on a road without error, a path prediction method thereof and a computer readable medium for performing the same.

Discussion of the Related Art

In general, a navigation terminal, in which a global positioning system (GPS) to confirm a corresponding current position and a moving velocity or to determine a moving path is mounted, is used in ships, airplanes, vehicles and mobile terminals.

Such a navigation terminal receives position information including latitude, longitude and altitude from a plurality of satellites, maps a current position on map information and then provides a moving path.

However, in such a conventional navigation terminal, error in position information received from the GPS may be generated, a position information collection cycle may not be proper for a moving path, and geographic information received from a geographic information system (GIS) may be incorrect.

Therefore, the conventional navigation terminal may not achieve correct moving path search in ships, airplanes, vehicles and mobile terminals.

PRIOR ART DOCUMENT

Patent Document (Patent Document 1) 1. Korean Patent Laid-open Publication No.: 2008-0084504, Publication Date: Sep. 19, 2008, Title of Invention: Method for clustering similar trajectories of moving objects in road network databases.
(Patent Document 2) 2. Korean Patent Laid-open Publication No.: 2010-0132766, Publication Date: Dec. 20, 2010, Title of Invention: Destination prediction apparatus and method.

Non-Patent Document (Non-patent Document 1) Title: Mining User Similarity Based on Location History, Author: Quannan Li, Yu Zheng, Xing Xie, Yukun Chen, Wenyu Liu, Wei-Ying Ma, In: Proceedings of the 16th ACM SIGSPATIAL international conference on Advances in geographic information systems, GIS' 08, pp. 34:1-34:10, ACM, New York, N.Y.

SUMMARY OF THE INVENTION

Accordingly, the present invention is directed to a navigation system, a path prediction method thereof and a computer readable medium for performing the same that substantially obviate one or more problems due to limitations and disadvantages of the related art.

An object of the present invention is to provide a navigation system, in which one corrected moving path is extracted by time sequentially correcting position information of a GPS and reflecting corrected road information in the corrected position information, a path prediction method thereof and a computer readable medium for performing the same.

Another object of the present invention is to provide a navigation system, which is resistant to error in time sequentially received position information of a GPS, a path prediction method thereof and a computer readable medium for performing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a navigation terminal for providing an intelligent path service using a clustered path model includes a path controller configured to identify moving trajectories reaching respective points of interest, to cluster the identified moving trajectories into at least one moving section, to reflect a road correction mechanism to the at least one clustered moving section and to cluster the at least one clustered moving section into at least one moving path, and to extract one moving path, in which time sequential position information received from a GPS is corrected, from the at least one clustered moving path.

The path controller may include a moving trajectory identification unit configured to identify the moving trajectories using points of interest and moving behavior information of a user or a vehicle.

The moving trajectory identification unit may use the moving behavior information including walking of the user, running of the user, getting of the user into/out of a car, and getting of the user on/off a subway train.

The path controller may further include a moving trajectory classification unit configured to classify moving trajectories having the same start point and the same end point from among the identified moving trajectories.

The path controller may further include a moving section clustering unit configured to detect degrees of similarity of the classified moving trajectories in the same class and to primarily cluster the moving trajectories into at least one moving section cluster.

The moving section clustering unit may be configured to set a first moving trajectory from among the moving trajectories in the same class to a first moving section cluster and then to achieve clustering by inserting the first moving section cluster into the at least one moving section cluster.

The moving section clustering unit may be configured to calculate a similarity function $SIM(C_n, TR_j)$ by applying the moving trajectories in the same class starting from a second moving trajectory to Equation 1 below and to calculate a distance between two arbitrary road sections $S_{TRJ}{}''(Li)$ and $S_{Cn}(Li)$ using Equation 2 below so as to cluster the moving trajectories into the at least one moving section cluster, $$SIM(C_n, TR_j) = \sum_{n=1} \delta(s_{TR_j}^n, S_{C_n})/n \quad \text{[Equation 1]}$$

$\delta(s_{TR_j}^n, S_{C_n})$: Shortest distance between $s_{TR_j}^n$ and $S_{C_n}$
$s_{TR_j}^n$: nth distance of $TR_j$
$S_{C_n}$: arbitrary distance constituting $C_n$, and $$D_{ist}(L_i,L_j)=d_{center}(L_i,L_j)+d_\theta(L_i,L_j)+d_\|(L_i,L_j) \quad \text{[Equation 2]}$$

$d_{center}(L_i, L_j)=\|(center_i-center_j)\|$
$d_\theta(L_i, L_j)=\|L_i\|\times\sin(\theta)$, $0°\leq\theta\leq 90°$ or $\|L_j\|$, $90°\leq\theta\leq 180°$
$d_\|(L_i, L_j)=\min(l_{\|1}, l_{\|2})$, wherein $D_{ist}(L_i, L_j)$ denotes a distance between $L_i$ and $L_j$, $d_{center}(L_i, L_j)$ denotes a distance between the central point $center_i$ of $L_i$ and the central point $center_j$ of $L_j$, $d_\theta(L_i, L_j)$ denotes a difference between the angle of $L_i$ and the angle of $L_j$, and $d_\|(L_i, L_j)$ denotes, when $L_i$ and $L_j$ overlap, a smaller length out of $l_{\|1}$ and $l_{\|2}$ which do not overlap.

The moving section clustering unit may be configured to select a moving section cluster having a high degree of similarity to a current selected moving trajectory using Equation 1 and to cluster the moving trajectory into the selected moving section cluster.

The moving section clustering unit may be configured to cluster a moving trajectory of a specific moving section into the moving section cluster, if a degree of similarity calculated through Equation 1 is smaller than a preset critical value.

The moving section clustering unit may be configured to preset the moving trajectory of the specific moving section to a new moving section cluster, if the degree of similarity calculated through Equation 1 is greater than the preset critical value.

The path controller may further include a moving path extraction unit configured to track time sequential moving trajectories for each two arbitrary moving sections of the primarily clustered at least one moving section cluster and to extract respective moving paths.

The path controller may further include a moving path clustering unit configured to secondarily cluster moving paths, which are not clustered, in the respective extracted moving paths using a degree of road similarity and inflection points.

The moving path clustering unit may be configured to calculate the degree of road similarity through Equation 3 below, $$S=a_1b_1/a_1b_0+a_0b_1+a_1b_1, \quad \text{[Equation 3]}$$

wherein $a_1b_0$ or $a_0b_1$ denotes the number of roads present on either of the two moving trajectories, and $a_1b_1$ denotes the number of roads present on both the two moving paths.

The moving path clustering unit may be configured to extract an inflection point generated from each of the respective moving paths through Equation 4 below and to calculate a distance from the extracted inflection point so as to achieve secondary clustering, $$\theta = p_i.h - p_{i-1}.h.$$
$$d = \sum_i^n \min(ai, b), \quad \text{[Equation 4]}$$

wherein $\theta$ denotes an inflection angle, $P_{i-1}$ denotes a moving path, and h denotes an inflection point.

The path controller may further include a moving path generation unit configured to extract one moving path including the same moving trajectories from the respective secondarily clustered moving paths using road information including the respective moving paths.

In another aspect of the present invention, a navigation system includes a moving path reception module configured to receive one moving path extracted by the above-described navigation terminal, a moving path mapping module configured to map the one received moving path on a map, and a moving path guide module configured to guide at least one destination and an arrival time at the destination using the one mapped moving path.

The navigation terminal may be one of a head unit, an audio video navigation (AVN) unit, a telematics unit and a cluster display unit.

In yet another aspect of the present invention, a path prediction method for providing an intelligent path service using a clustered path model includes identifying moving trajectories reaching respective points of interest through a path controller and clustering the identified moving trajectories into at least one moving section through the path controller, and reflecting a road correction mechanism to the at least one clustered moving section, clustering the at least one clustered moving section into at least one moving path through the path controller and extracting one moving path, in which time sequential position information received from a GPS is corrected, from the at least one clustered moving path.

The identification and clustering of the moving trajectories may further include identifying the moving trajectories using points of interest and moving behavior information of a user or a vehicle through a moving trajectory identification unit.

In the identification and clustering of the moving trajectories, the moving trajectories may be identified using the moving behavior information including walking of the user, running of the user, getting of the user into/out of a car, and getting of the user on/off a subway train through the moving trajectory identification unit.

The identification and clustering of the moving trajectories may further include classifying moving trajectories having the same start point and the same end point from among the identified moving trajectories through a moving trajectory classification unit.

The identification and clustering of the moving trajectories may further include detecting degrees of similarity of the classified moving trajectories in the same class and primarily clustering the moving trajectories into at least one moving section cluster through a moving section clustering unit.

In the primary clustering of the moving trajectories, the moving section clustering unit may set a first moving trajectory from among the moving trajectories in the same class to a first moving section cluster and then achieve clustering by inserting the first moving section cluster into the at least one moving section cluster.

In the primary clustering of the moving trajectories, the moving section clustering unit may calculate a similarity function $SIM(C_n, TR_j)$ by applying the moving trajectories in the same class starting from a second moving trajectory to Equation 5 below and calculate a distance between two arbitrary road sections $S_{TRJ}^n(Li)$ and $S_{Cn}(Li)$ using Equation 6 below so as to cluster the moving trajectories into the at least one moving section cluster, $$SIM(C_n, TR_j) = \sum_{n=1}^{} \delta(s_{TR_j}^n, S_{C_n})/n \quad \text{[Equation 5]}$$

$\delta(s_{TR_j}{}^n, S_{C_n})$: Shortest distance between $s_{TR_j}{}^n$ and $S_{C_n}$
$s_{TR_j}{}^n$: nth distance of $TR_j$
$S_{C_n}$: arbitrary distance constituting $C_n$, and $$D_{ist}(L_i,L_j)=d_{center}(L_i,L_j)+d_\theta(L_i,L_j)+d_\parallel(L_i,L_j) \quad \text{[Equation 6]}$$

$d_{center}(L_i, L_j)=\|(center_i-center_j)\|$
$d_\theta(L_i, L_j)=\|L_i\|\times\sin(\theta)$, $0°\leq\theta\leq90°$ or $\|L_j\|$, $90°\leq\theta\leq180°$
$d_\parallel(L_i, L_j)=\min(l_{\parallel 1}, l_{\parallel 2})$, wherein $D_{ist}(L_i, L_j)$ denotes a distance between $L_i$ and $L_j$, $d_{center}(L_i, L_j)$ denotes a distance between the central point $center_i$ of $L_i$ and the central point $center_j$ of $L_j$, $d_\theta(L_i, L_j)$ denotes a difference between the angle of $L_i$ and the angle of $L_j$, and $d_\parallel(L_i, L_j)$ denotes, when $L_i$ and $L_j$ overlap, a smaller length out of $l_{\parallel 1}$ and $l_{\parallel 2}$ which do not overlap.

In the primary clustering of the moving trajectories, the moving section clustering unit may select a moving section cluster having a high degree of similarity to a current selected moving trajectory using Equation 5 and cluster the moving trajectory into the selected moving section cluster.

Further, in the primary clustering of the moving trajectories, the moving section clustering unit may cluster a moving trajectory of a specific moving section into the moving section cluster, if a degree of similarity calculated through Equation 5 is smaller than a preset critical value.

Further, in the primary clustering of the moving trajectories, the moving section clustering unit may set the moving trajectory of the specific moving section to a new moving section cluster, if the degree of similarity calculated through Equation 5 is greater than the preset critical value.

The reflection of the road correction mechanism, clustering of the at least one clustered moving section and extraction one moving path may further include tracking time sequential moving trajectories for each two arbitrary moving sections of the primarily clustered at least one moving section cluster and extracting respective moving paths through a moving path extraction unit.

The reflection of the road correction mechanism, clustering of the at least one clustered moving section and extraction one moving path may further include secondarily clustering moving paths, which are not clustered, in the respective extracted moving paths using a degree of road similarity and inflection points through a moving path clustering unit.

In the secondary clustering, the moving path clustering unit may calculate the degree of road similarity through Equation 7 below, $$S=a_1b_1/a_1b_0+a_0b_1+a_1b_1, \quad \text{[Equation 7]}$$

wherein $a_1b_0$ or $a_0b_1$ denotes the number of roads present on either of the two moving trajectories, and $a_1b_1$ denotes the number of roads present on both the two moving paths.

In the secondary clustering, the moving path clustering unit may extract an inflection point generated from each of the respective moving paths through Equation 8 below and to calculate a distance from the extracted inflection point so as to achieve secondary clustering, $$\theta = p_i.h - p_{i-1}.h. \quad \text{[Equation 8]}$$
$$d = \sum_i^n \min(ai, b),$$

wherein θ denotes an inflection angle, $P_{i-1}$ denotes a moving path, and h denotes an inflection point.

The reflection of the road correction mechanism, clustering of the at least one clustered moving section and extraction one moving path may further include extracting one moving path including the same moving trajectories from the respective secondarily clustered moving paths using road information including the respective moving paths through a moving path generation unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. In the drawings, the same or similar elements are denoted by the same reference numerals even though they are depicted in different drawings, and a detailed description thereof will be omitted.

Embodiment 1

Figure 1:
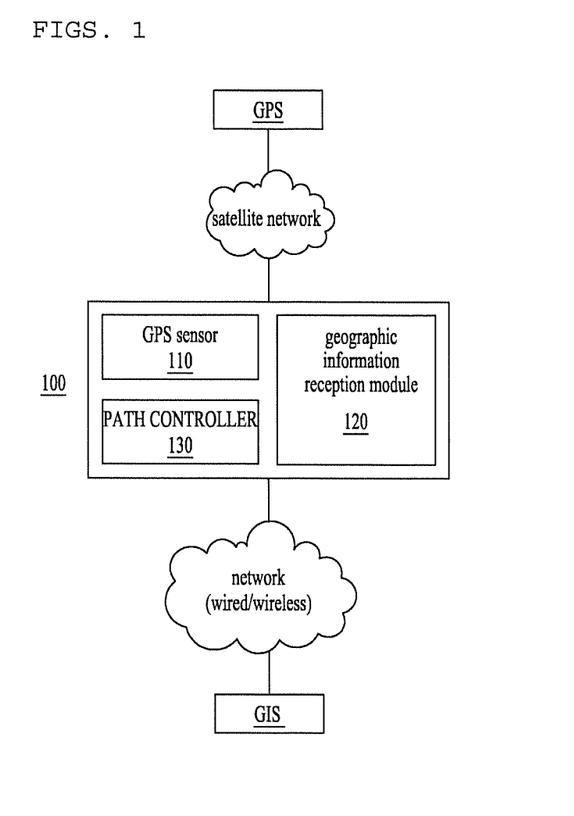
FIG. 1 is a schematic block diagram briefly illustrating a navigation terminal in accordance with one embodiment of the present invention.
Figure 2:
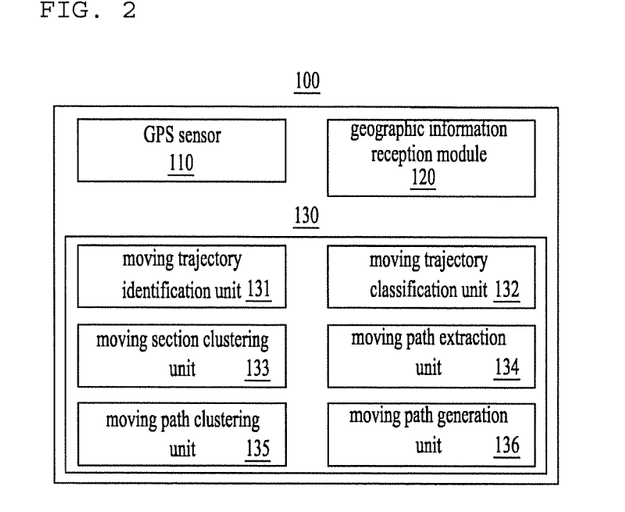
FIG. 2 is a schematic block diagram illustrating the navigation terminal in accordance with one embodiment of the present invention in more detail.

FIG. 1 is a schematic block diagram briefly illustrating a navigation terminal in accordance with one embodiment of the present invention and FIG. 2 is a schematic block diagram illustrating the navigation terminal in accordance with one embodiment of the present invention in more detail.

As exemplarily shown in these figures, a navigation terminal 100 in accordance with one embodiment of the present invention includes a GPS sensor 110 to acquire position information by tracking the moving position of a moving object from a GPS, a geographic information reception module 120 to receive geographic information (including road information) of areas through which the moving object passes from a geographic information system (GIS), and a path controller 130 to predict an accurate path model clustered using the position information and geographical information and providing an intelligent path service therethrough. Hereinafter, the path controller 130 shown in FIG. 2 will be described in more detail.

The path controller 130 in accordance with the present invention identifies moving trajectories reaching respective points of interest. Here, the moving trajectory means a trajectory through which a moving object, for example, a person or a vehicle, habitually moves from a specific point of interest to another point of interest.

These moving trajectories may be known through points of interest and moving behavior information of a user or a vehicle. That is, the path controller 130 in accordance with the present invention includes a moving trajectory identification unit 131 to identify moving trajectories using the points of interest and the moving behavior information of the user or the vehicle.

Here, the moving behavior information includes, if the moving object is a user (person), walking of the user, running of the user, getting of the user into/out of a car, and getting of the user on/off a subway train. Therefore, when such moving behavior information and several points of interest are known, the moving trajectory identification unit 131 may recognize moving behavior of the user occurring between respective points of interest through which the user habitually moves from a specific point of interest to another point of interest and thus easily identify moving trajectories of the user.

However, if the moving object is a vehicle not a person, moving behavior does not relate to walking, running, getting into/out of a car, and getting on/off a subway train, and road states and the like correspond to moving behavior. In this case, when the moving trajectory identification unit 131 recognizes moving behavior and several points of interest of the vehicle, the moving trajectory identification unit 131 may sufficiently identify moving trajectories of the vehicle.

Such moving behavior information and several points of interest used in identification of moving trajectories may be input by a user or acquired by the path controller 130 through tracking. For example, a separate acquisition device (not shown) to acquire moving behavior information and points of interest through tracking may be provided in the navigation terminal 100.

When the moving trajectories are identified in such a manner, the path controller 130 in accordance with the present invention clusters the identified moving trajectories into one or more moving sections. Here, the moving sections are discriminated from the above-described moving trajectories.

For example, on the assumption that there are paths A, B and C, it may be predicted that several moving trajectories are present between the path A and the path B and a section selected from the moving trajectories may be defined as a moving section. Therefore, two moving paths from the path A to the path C are present and a plurality of moving trajectories is present on each moving path.

Figure 3:
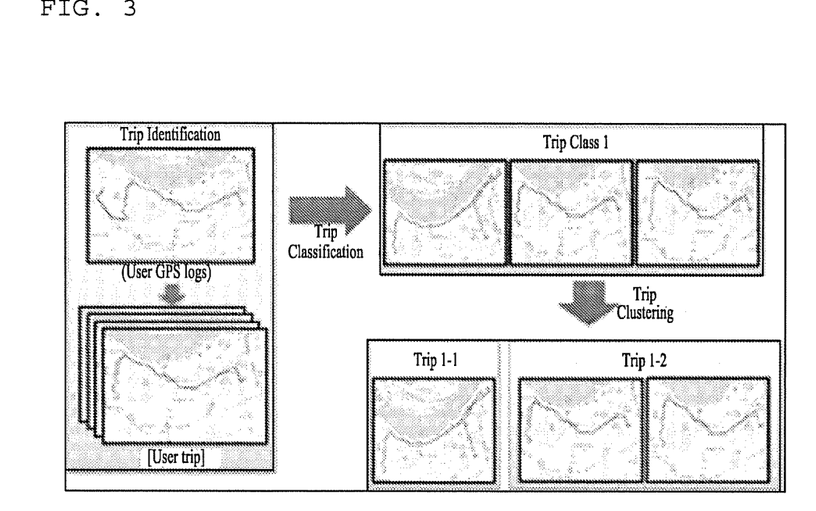
FIG. 3 is a view illustrating classified moving trajectories and clustered moving section states in accordance with one embodiment of the present invention.

In order to cluster the moving trajectories into the moving sections, the path controller 130 in accordance with the present invention may further include a moving trajectory classification unit 132 and a moving section clustering unit 133. The moving trajectory classification unit 132 may classify the moving trajectories identified by the above-described moving trajectory identification unit 131 into moving trajectories having the same start point and the same end point between the respective moving sections. FIG. 3 illustrates these classified moving trajectories. As exemplarily shown in FIG. 3, there is a plurality of classified moving trajectories. When trajectory classification has been carried out, the moving section clustering unit 133 in accordance with the present invention detects degrees of similarity of moving trajectories in the same class and primarily clusters the moving trajectories into at least one moving section cluster $C_n$. FIG. 3 illustrates primarily clustered moving section clusters.

Primary clustering into the moving section clusters $C_n$ means a process of clustering similar moving trajectories from among moving trajectories in the same class into one moving section. For example, if a specific set of moving trajectories $TR_1, TR_2, TR_3, \ldots TR_n$ is given, moving section clusters $C_n$ will be completed through a procedure below.

That is, first, the moving section clustering unit 133 in accordance with the present invention may set a first moving trajectory $TR_1$ from among moving trajectories in the same class to a first moving section cluster $C_1$ and then achieve clustering by inserting the first moving section cluster $C_1$ into the moving section clusters $C_n$.

Thereafter, the moving section clustering unit 133 in accordance with the present invention calculates a similarity function $SIM(C_n, TR_j)$ by applying the moving trajectories in the same class starting from a second moving trajectory $TR_2$ to Equation 1 below.

$$SIM(C_n, TR_j) = \sum_{n=1} \delta(s_{TR_j}^n, S_{C_n})/n \qquad \text{[Equation 1]}$$

$\delta(s_{TR_j}^n, S_{C_n})$: Shortest distance between $s_{TR_j}^n$ and $S_{C_n}$
$s_{TR_j}^n$: nth distance of $TR_j$
$S_{C_n}$: arbitrary distance constituting $C_n$ For example, when the value of the similarity function $SIM(C_n, TR_j)$ is calculated, the moving section clustering unit 133 in accordance with the present invention may select the moving section cluster $C_n$ having a high degree of similarity to a current selected moving trajectory $TR_j$ using the calculated value of the similarity function $SIM(C_n, TR_j)$ and cluster the moving trajectory $TR_j$ into the selected moving section cluster $C_n$.

For example, if the result of a degree of similarity calculated through the above-described Equation 1 is smaller than a preset critical value, the moving section clustering unit 133 in accordance with the present invention may cluster a moving trajectory $TR_j$ of a specific moving section into a corresponding moving section cluster $C_n$.

However, if the result of the degree of similarity calculated through the above-described Equation 1 is greater than the preset critical value, the moving section clustering unit 133 in accordance with the present invention may set the moving trajectory $TR_j$ of the specific moving section to a new moving section cluster $C_n$.

Figure 4:
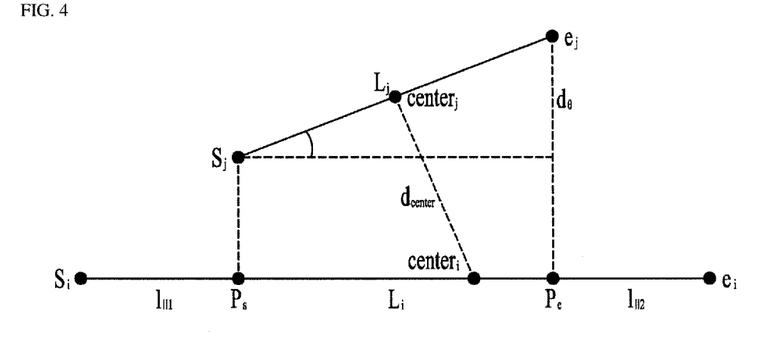
FIG. 4 is a view illustrating a distance state between road sections in accordance with one embodiment of the present invention.

Further, if the moving section clustering unit 133 in accordance with the present invention judges that the moving trajectories are not clustered into moving section clusters $C_n$ using the above-described Equation 1, i.e., the similarity function SIM($C_n$, $TR_j$), the moving section clustering unit 133 may calculate a distance between two arbitrary road sections $S_{TRj}{}''(Li)$ and $S_{Cn}(Li)$ and cluster the remaining moving trajectories into the moving section clusters $C_n$.

$$D_{ist}(L_i,L_j)=d_{center}(L_i,L_j)+d_\theta(L_i,L_j)+d_\|(L_i,L_j) \quad \text{[Equation 2]}$$

$d_{center}(L_i, L_j) = \|(\text{center}_i - \text{center}_j)\|$
$d_\theta(L_i, L_j) = \|L_i\| \times \sin(\theta)$, $0° \le \theta \le 90°$ or $\|L_j\|$, $90° \le \theta \le 180°$
$d_\|(L_i, L_j) = \min(l_{\|1}, l_{\|2})$ Here, $D_{ist}(L_i, L_j)$ denotes a distance between $L_i$ and $L_j$, $d_{center}(L_i, L_j)$ denotes a distance between the central point $\text{center}_i$ of $L_i$ and the central point $\text{center}_j$ of $L_j$, $d_\theta(L_i, L_j)$ denotes a difference between the angle of $L_i$ and the angle of $L_j$, and $d_\|(L_i, L_j)$ denotes, when $L_i$ and $L_j$ overlap, a smaller length out of $l_{\|1}$ and $l_{\|2}$ which do not overlap.

By calculating degrees of similarity of moving trajectories in the same class through the similarity function SIM($C_n$, $TR_j$) and the distance between the road sections $S_{TRj}{}''(Li)$ and $S_{Cn}(Li)$ in such a manner, primary clustering into at least one moving section cluster $C_n$ is completed.

When primary clustering into the moving section cluster $C_n$ is carried out, the path controller 130 in accordance with the present invention reflects an acquired road correction mechanism in each moving section primarily clustered by the moving section clustering unit 133, thus achieving clustering into at least one moving path.

Since, as a result of primary clustering, the same path may be judged as a different path due to error of a sensor or error in correction, such clustering into the moving path is carried out so as to minimize such error.

For this purpose, the path controller 130 in accordance with the present invention may further include a moving path extraction unit 134 and a moving path clustering unit 135. First, the moving path extraction unit 134 in accordance with the present invention tracks time sequential moving trajectories for each two arbitrary moving sections of the moving section clusters, primarily clustered by the moving section clustering unit 133, and extracts respective moving paths including moving section clusters having the same sequence. As described above, the extracted moving paths differ from moving trajectories.

On the other hand, the moving path clustering unit 135 in accordance with the present invention secondarily clusters moving paths, which are not clustered, in the respective moving paths extracted by the moving path extraction unit 134 using a degree of road similarity. Here, a degree of similarity of moving trajectories between paths having the same start point and the same end point are calculated, and such a degree of similarity will be expressed by Equation 3 below.

$$S = a_1b_1/a_1b_0 + a_0b_1 + a_1b_1 \quad \text{[Equation 3]}$$

In Equation 3, $a_1b_0$ or $a_0b_1$ denotes the number of roads present on either of the two moving trajectories, and $a_1b_1$ denotes the number of roads present on both the two moving paths. In this case, if the degree S of similarity calculated by Equation 3 is greater than a predetermined critical value, these moving trajectories may be regarded as the same moving trajectory and thus, the moving paths having these moving trajectories may be secondarily clustered.

Further, the moving path clustering unit 135 in accordance with the present invention may extract an inflection point (feature point) h from each of the respective moving paths including the same moving trajectories, acquired by Equation 3, using Equation 4 below and calculate a distance from the extracted inflection point h and thereby, secondarily cluster moving paths which are not clustered.

$$\theta = p_i.h - p_{i-1}.h. \quad \text{[Equation 4]}$$

$$d = \sum_i^n \min(ai, b),$$

In Equation 4, $\theta$ denotes an inflection angle, $P_{i-1}$ denotes a moving path, and h denotes an inflection point (feature point). By maximally filling up road information including inflection points and road similarity to supplement presence of roads unknown due to sensing error of the GPS sensor 110, superior moving trajectories may be completed and thus, non-clustered moving paths may be secondarily clustered.

The path controller 130 in accordance with the present invention may further include a moving path generation unit 136, when secondary clustering is carried out, extracts one moving path in which time sequential position information received from the GPS is corrected from the respective moving paths clustered by the above-described moving path clustering unit 135. Here, one moving path means one path including the same moving trajectories.

In this manner, one optimized moving path may be extracted using paths in clusters and road information (in/out, position information) including the respective paths. Here, each cluster may include one moving path including the same moving trajectories and such a moving path may be filled with moving trajectories in which roads unknown due to sensing error of the GPS sensor 110 are completely corrected.

As described above, this embodiment may more clearly detect a moving path by performing more precise clustering resistant to error and precisely predict the moving path of a moving object, for example, a person or a vehicle.

Embodiment 2

Figure 5:
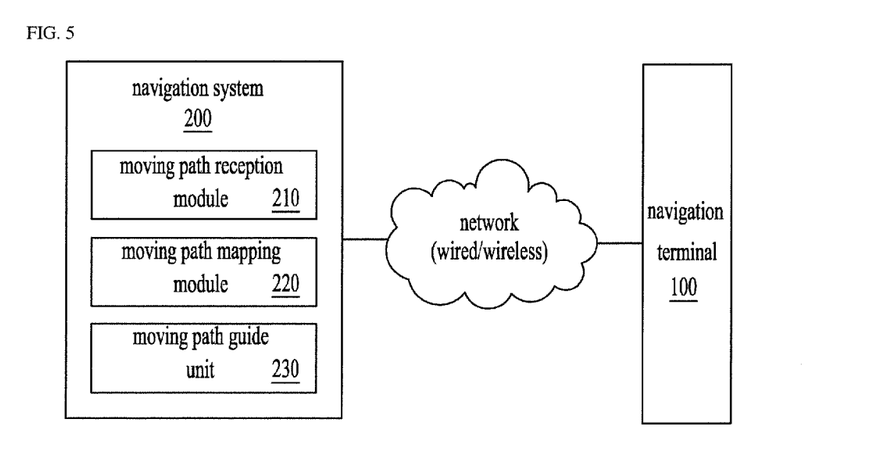
FIG. 5 is a block diagram exemplarily illustrating a navigation system in accordance with another embodiment of the present invention.

FIG. 5 is a block diagram exemplarily illustrating a navigation system in accordance with another embodiment of the present invention.

With reference to FIG. 5, a navigation system 200 in accordance with another embodiment of the present invention includes a moving path reception module 210, a moving path mapping module 220 and a moving path guide unit 230, so as to provide an intelligent path service using a clustered path model.

First, the moving path reception module 210 in accordance with the present invention receives one moving path extracted by the navigation terminal 100 in accordance with the aforementioned embodiment shown in FIGS. 1 to 4. The navigation terminal 100 may be one of a head unit, an audio video navigation (AVN) unit, a telematics unit and a cluster display unit.

In this case, the navigation system 200 in accordance with the present invention may be connected to the navigation terminal 100 through CAN communication. However, the disclosure is not limited to CAN communication. For example, the navigation system 200 and the navigation terminal 100 may be connected through a wired network. The navigation terminal 100 has been sufficiently described in the aforementioned embodiment shown in FIGS. 1 to 4 and a detailed description thereof will thus be omitted in this embodiment.

The moving path mapping module 220 in accordance with the present invention serves to map one moving path received by the moving path reception module 210 on a map. The moving path may include a plurality of paths from an origin to a destination.

Thereby, when the moving path including a plurality of paths is mapped, a user confirming the map may confirm a precise moving path in which error of position information is corrected.

Finally, the moving path guide unit 230 serves to guide at least one destination and an arrival time at each destination using one moving path on the map. The arrival time may be guided through voice or text. Such guidance of the arrival time through voice or text may provide very safe guidance during driving.

The above-described navigation terminal 100 is not limited to application to the navigation system 200 in accordance with this embodiment and may be one of various terminals. For example, the navigation terminal 100 may be a mobile terminal providing road traffic information, providing public transportation schedule information, or performing a destination related recommended service, and further applied to ships and airplanes. However, the navigation terminal 100 is not limited thereto and may be applied to all systems requiring a navigation system.

Embodiment 3

Figure 6:
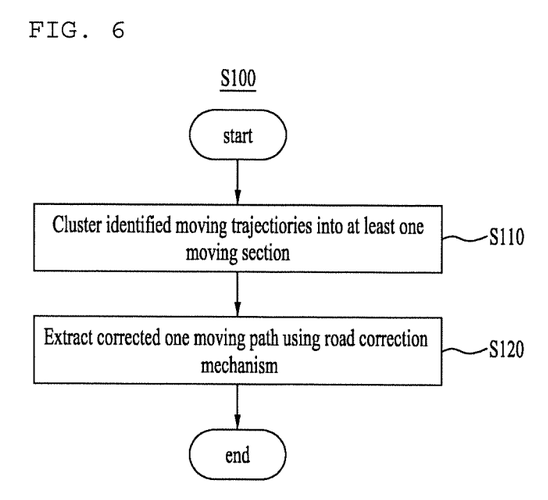
FIG. 6 is a flowchart exemplarily illustrating a path prediction method of a navigation terminal in accordance with yet another embodiment of the present invention.
Figure 7:
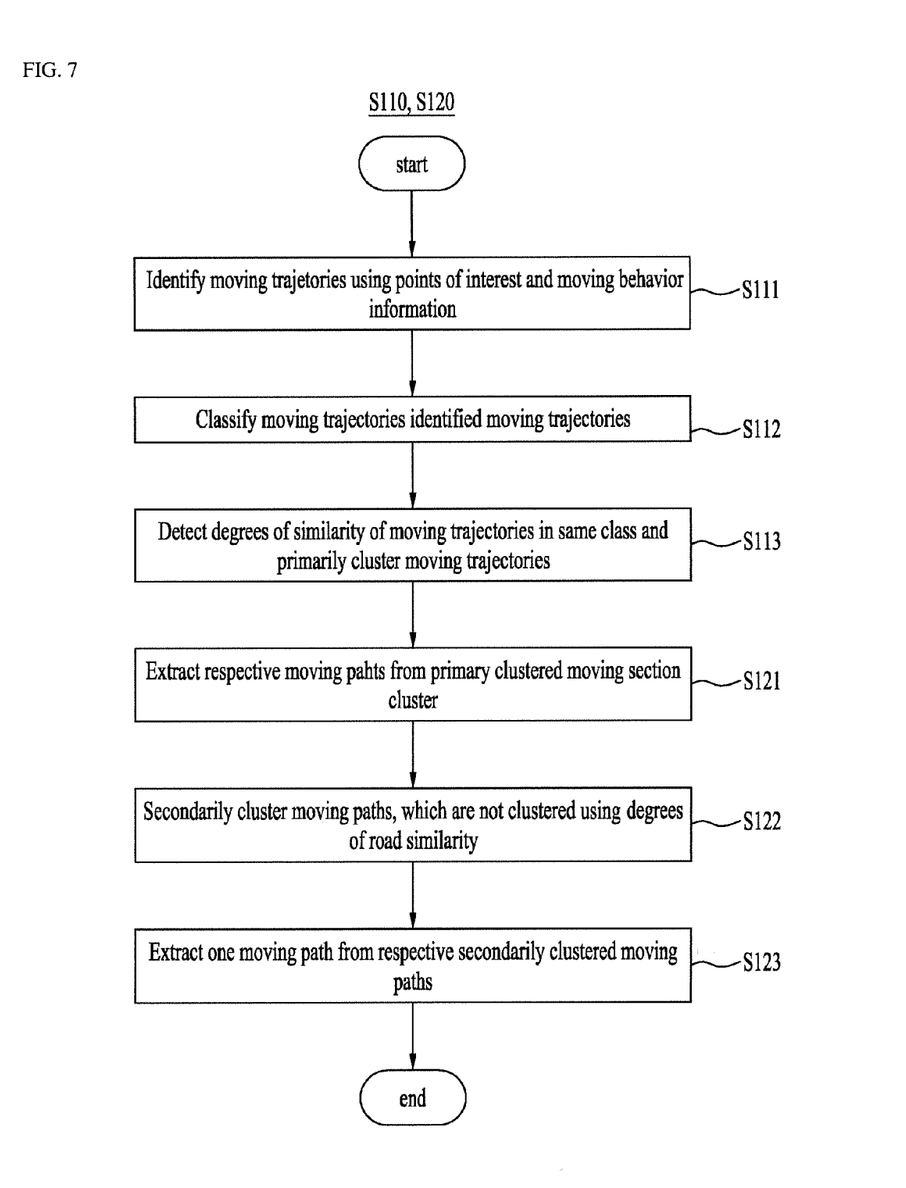
FIG. 7 is a flowchart illustrating the path prediction method in accordance with yet another embodiment of the present invention in more detail.

FIG. 6 is a flowchart exemplarily illustrating a path prediction method of a navigation terminal in accordance with yet another embodiment of the present invention and FIG. 7 is a flowchart illustrating the path prediction method in accordance with yet another embodiment of the present invention in more detail.

As exemplarily shown in these figures, a path prediction method S100 of the navigation terminal 100 in accordance with this embodiment of the present invention includes Operations S110 and S120 so as to provide an intelligent path service using a clustered path model.

First, in Operation S110 in accordance with the present invention, the path controller 130 identifies moving trajectories reaching respective points of interest. Here, the moving trajectory means a trajectory through which a moving object, for example, a person or a vehicle, habitually moves from a specific point of interest to another point of interest.

These moving trajectories may be known through points of interest and moving behavior information of a user or a vehicle. That is, in Operation S110 in accordance with the present invention, the moving trajectory identification unit 131 identifies moving trajectories using the points of interest and the moving behavior information of the user or the vehicle (Operation S111).

Here, the moving behavior information includes, if the moving object is a user (person), walking of the user, running of the user, getting of the user into/out of a car, and getting of the user on/off a subway train. Therefore, when such moving behavior information and several points of interest are known, the moving trajectory identification unit 131 may recognize moving behavior of the user occurring between respective points of interest through which the user habitually moves from a specific point of interest to another point of interest and thus easily identify moving trajectories of the user.

However, if the moving object is a vehicle not a person, moving behavior does not relate to walking, running, getting into/out of a car, and getting on/off a subway train, and road states and the like may correspond to moving behavior. In this case, when the moving trajectory identification unit 131 recognizes moving behavior and several points of interest of the vehicle, the moving trajectory identification unit 131 may sufficiently identify moving trajectories of the vehicle.

Such moving behavior information and several points of interest used in identification of moving trajectories may be input by a user or acquired through tracking in Operation S110. For example, if a separate acquisition device (not shown) to acquire moving behavior information and points of interest through tracking is provided in the navigation terminal 100, moving behavior information and points of interest may be acquired by the acquisition device (not shown).

Thereafter, in Operation S110, the moving trajectory classification unit 132 classifies the moving trajectories identified by the moving trajectory identification unit 131 into moving trajectories having the same start point and the same end point between the respective moving sections (Operation S112).

FIG. 3 illustrates these classified moving trajectories. As exemplarily shown in FIG. 3, there is a plurality of classified moving trajectories.

Thereafter, in Operation S110 in accordance with the present invention, the moving section clustering unit 133 detects degrees of similarity of moving trajectories in the same class, acquired in Operation S112, and primarily clusters the moving trajectories into at least one moving section cluster $C_n$ (Operation S113). FIG. 3 illustrates primarily clustered moving section clusters.

Here, moving sections are discriminated from the above-described moving trajectories. For example, on the assumption that there are paths A, B and C, it may be predicted that several moving trajectories are present between the path A and the path B and a section selected from the moving trajectories may be defined as a moving section. Therefore, two moving paths from the path A to the path C are present and a plurality of moving trajectories is present on each moving path.

Primary clustering into the moving section clusters $C_n$ means a process of clustering similar moving trajectories from among moving trajectories in the same class into one moving section. For example, if a specific set of moving trajectories $TR_1, TR_2, TR_3, \ldots TR_n$ is given, moving section clusters $C_n$ will be completed through a procedure below.

That is, first, in Operation S110 in accordance with the present invention, the moving section clustering unit 133 may set a first moving trajectory $TR_1$ from among moving trajectories in the same class to a first moving section cluster $C_1$ and then achieve clustering by inserting the first moving section cluster $C_1$ into the moving section clusters $C_n$.

Thereafter, in Operation S110 in accordance with the present invention, the moving section clustering unit 133 calculates a similarity function $SIM(C_n, TR_j)$ by applying the moving trajectories in the same class starting from a second moving trajectory $TR_2$ to Equation 5 below.

$$SIM(C_n, TR_j) = \sum_{n=1} \delta(s_{TR_j}^n, S_{C_n})/n \qquad \text{[Equation 5]}$$

$\delta(s_{TR_j}^n, S_{C_n})$: Shortest distance between $s_{TR_j}^n$ and $S_{C_n}$
$s_{TR_j}^n$: nth distance of $TR_j$
$S_{C_n}$: arbitrary distance constituting $C_n$ When the value of the similarity function SIM($C_n$, $TR_j$) is calculated, in Operation S110 in accordance with the present invention, the moving section clustering unit 133 may select the moving section cluster $C_n$ having a high degree of similarity to a current selected moving trajectory $TR_j$ using the calculated value of the similarity function SIM($C_n$, $TR_j$) and cluster the moving trajectory $TR_j$ into the selected moving section cluster $C_n$.

For example, if the result of a degree of similarity calculated through the above-described Equation 5 is smaller than a preset critical value, in Operation S110 in accordance with the present invention, the moving section clustering unit 133 may cluster a moving trajectory $TR_j$ of a specific moving section into a corresponding moving section cluster $C_n$.

However, if the result of degree of similarity calculated through the above-described Equation 5 is greater than the preset critical value, the moving section clustering unit 133 may set the moving trajectory $TR_j$ of the specific moving section to a new moving section cluster $C_n$.

Further, in Operation S110, if the moving section clustering unit 133 judges that the moving trajectories are not clustered into moving section clusters $C_n$ using the above-described Equation 5, i.e., the similarity function SIM($C_n$, $TR_j$), the moving section clustering unit 133 may calculate a distance between two arbitrary road sections $S_{TRj}''(Li)$ and $S_{Cn}(Li)$ using Equation 6 below and cluster the remaining moving trajectories into the moving section clusters $C_n$, with reference to FIG. 4.

$$D_{ist}(L_i, L_j) = d_{center}(L_i, L_j) + d_\theta(L_i, L_j) + d_\parallel(L_i, L_j)$$ [Equation 6]

$d_{center}(L_i, L_j) = \|(center_i - center_j)\|$
$d_\theta(L_i, L_j) = \|L_i\| \times \sin(\theta)$, $0° \leq \theta \leq 90°$ or $\|L_j\|$, $90° \leq \theta \leq 180°$
$d_\parallel(L_i, L_j) = \min(l_{\parallel 1}, l_{\parallel 2})$ Here, $D_{ist}(L_i, L_j)$ denotes a distance between $L_i$ and $L_j$, $d_{center}(L_i, L_j)$ denotes a distance between the central point $center_i$ of $L_i$ and the central point $center_j$ of $L_j$, $d_\theta(L_i, L_j)$ denotes a difference between the angle of $L_i$ and the angle of $L_j$, and $d_\parallel(L_i, L_j)$ denotes, when $L_i$ and $L_j$ overlap, a smaller length out of $l_{\parallel 1}$ and $l_{\parallel 2}$ which do not overlap.

By calculating degrees of similarity of moving trajectories in the same class through the similarity function SIM($C_n$, $TR_j$) and the distance between the road sections $S_{TRj}''(Li)$ and $S_{Cn}(Li)$ in such a manner, primary clustering into at least one moving section cluster $C_n$ is completed.

When primary clustering into the moving section cluster $C_n$ is carried out, Operation S120 is carried out. In Operation S120 in accordance with the present invention, the path controller 130 reflects an acquired road correction mechanism in each moving section primarily clustered by the moving section clustering unit 133, thus achieving clustering into at least one moving path. Here, the acquired road correction mechanism will be sufficiently understood through a description below.

Since, as a result of primary clustering, the same path may be judged as a different path due to error of a sensor or error in correction, such clustering into the moving path is carried out so as to minimize such error.

For this purpose, in Operation S120 in accordance with the present invention, the moving path extraction unit 134 tracks time sequential moving trajectories for each two arbitrary moving sections of moving section clusters, primarily clustered by the moving section clustering unit 133, and extracts each moving path including moving section clusters having the same sequence (Operation S121). As described above, the extracted moving paths differ from moving trajectories.

Thereafter, in Operation S120 in accordance with the present invention, the moving path clustering unit 135 secondarily clusters moving paths, which are not clustered, in the respective moving paths, extracted in Operation S121, using a degree of road similarity (Operation S122). Here, a degree of similarity of moving trajectories between paths having the same start point and the same end point are calculated, and such a degree of similarity will be expressed by Equation 7 below.

$$S = a_1 b_1 / a_1 b_0 + a_0 b_1 + a_1 b_1$$ [Equation 7]

In Equation 7, $a_1 b_0$ or $a_0 b_1$ denotes the number of roads present on either of the two moving trajectories, and $a_1 b_1$ denotes the number of roads present on both the two moving paths. In this case, if the moving path clustering unit 135 judges that the degree S of similarity calculated by Equation 7 is greater than a predetermined critical value, the moving path clustering unit 135 may regard these moving trajectories as the same moving trajectory and secondarily cluster moving paths provided with these moving trajectories.

Thereafter, in Operation S120 in accordance with the present invention, the moving path clustering unit 135 may extract an inflection point h from each of the respective moving paths including the same moving trajectories, acquired by Equation 7, using Equation 8 below and calculate a distance from the extracted inflection point h and thereby, secondarily cluster moving paths which are not clustered.

$$\theta = p_i.h - p_{i-1}.h$$ [Equation 8]

$$d = \sum_i^n \min(ai, b)$$

In Equation 8, θ denotes an inflection angle, $P_{i-1}$ denotes a moving path, and h denotes an inflection point (feature point). By maximally filling up road information including inflection points to supplement presence of roads unknown due to sensing error of the GPS sensor 110 and road similarity, the moving path clustering unit 135 may complete superior moving trajectories and thus, secondarily cluster non-clustered moving paths.

Finally, in Operation S120 in accordance with the present invention, when secondary clustering is carried out, the moving path generation unit 136 may extract one moving path in which time sequential position information received from the GPS is corrected from the respective moving paths clustered in Operation S122 (Operation S123). Here, one moving path means one path including the same moving trajectories.

In this manner, one optimized moving path may be extracted using paths in clusters and road information (in/out, position information) including the respective paths. Here, each cluster may include one moving path including the same moving trajectories and such a moving path may be filled with moving trajectories in which roads unknown due to sensing error of the GPS sensor 110 are completely corrected.

As described above, this embodiment may more clearly detect a moving path by performing more precise clustering resistant to error and precisely predict the moving path of a moving object, for example, a person or a vehicle.

The above-described embodiments may be recorded in a computer readable storage medium implemented in the form of a program command executable through various computer components. Computer readable storage media may individually or combinably include a program command, a data file, a data structure and the like. The program command recoded in the computer readable storage media may be specially designed and configured for the present invention or be known in those skilled in the field of computer software. For example, computer readable media include magnetic media, such as a hard disk, a floppy disk and a magnetic tape, an optical storage media, such as a CD-ROM and a DVD, a magneto-optical media, such as a floptical disk, and hardware devices configured to store and execute a program command, such as ROM, a RAM, and a flash memory. For example, program commands include not only machine language code generated by a compiler but also high level language code executable by a computer using an interpreter. The hardware devices may be configured to be operated as one or more software modules to perform processing of the present invention and vice versa.

As apparent from the above description, a navigation system, a path prediction method thereof and a computer readable medium for performing the same in accordance with the present invention are resistant to error of a GPS sensor, error generated due to a collection cycle, or error generated in correction and perform more precise clustering, thus more clearly acquiring a moving path. Thereby, the moving path of a moving object, for example, a person or a vehicle, may be more precisely predicted.

Further, the navigation system, the path prediction method thereof and the computer readable medium for performing the same in accordance with the present invention may construct an intelligent moving path service based on a clustered path model. For example, the navigation system, a path prediction method thereof and a computer readable medium for performing the same in accordance with the present invention may be applied to provision of road traffic information, provision of public transportation schedule information, or a destination related recommended service in which the moving path of a moving object (for example, a person or a vehicle) needs to be precisely predicted.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A path prediction method for providing a path on map information for use in a navigation terminal, the path prediction method comprising steps of:
   recognizing position information acquired by a global positioning system (GPS) sensor;
   identifying moving trajectories, by a path controller of the navigation terminal, the path controller communicatively connected to the GPS sensor, wherein each of the moving trajectories reaches each of points of interest based on the recognized position information and moving behavior information of a vehicle and a mobile terminal;
   classifying, by the path controller, the moving trajectories into a plurality of trajectory classes each having same start points and same end points;
   primarily clustering, by the path controller, the moving trajectories in each of the plurality of trajectory classes into at least one moving section cluster by detecting similarity of the moving trajectories;
   tracking, by the path controller, time sequential moving trajectories for each two arbitrary moving sections within the same moving section cluster of the primarily clustered at least one moving section cluster to thereby extract moving paths from the primarily clustered at least one moving section cluster, the moving paths consisting of at least one moving section cluster of which sequential orders are identical;
   secondarily clustering, by the path controller, the extracted moving paths into secondarily clustered moving paths by using a degree of road similarity and inflection points; and
   extracting, by the path controller, one path from the secondarily clustered moving paths to display a single extracted path on a screen of the navigation terminal, to minimize sensing error of the GPS sensor such that the single extracted path is not judged as two different paths due to the sensing error of the GPS sensor.

2. The path prediction method according to claim 1, wherein the moving behavior information includes walking of a user, running of the user, getting of the user into or out of a car, and getting of the user on or off a subway train, which are obtained from the mobile terminal.

3. The path prediction method according to claim 1, wherein the primarily clustering includes selecting a moving section cluster having a predetermined degree of similarity to a current selected moving trajectory and to cluster the current selected moving trajectory into the selected moving section cluster.

4. The path prediction method according to claim 3, wherein the primarily clustering includes clustering a moving trajectory of a specific moving section into the moving section cluster when the predetermined degree of similarity is smaller than a preset critical value.

5. The path prediction method according to claim 4, wherein the primarily clustering includes setting the moving trajectory of the specific moving section to a new moving section cluster when the predetermined degree of similarity is greater than the preset critical value.

6. The path prediction method according to claim 1, wherein the primarily clustering includes setting a first moving trajectory from among the moving trajectories in the same class to a first moving section cluster and then to achieve clustering by inserting the first moving section cluster into the at least one moving section cluster.

7. The path prediction method according to claim 1, wherein the step of extracting the one path includes extracting one moving path including the same moving trajectories from the respective secondarily clustered moving paths using road information including the respective moving paths.

8. A navigation terminal for providing a path on map information, comprising:
   a global positioning system (GPS) sensor configured to acquire position information;
   a path controller communicatively connected with the GPS sensor and configured to identify moving trajectories reaching respective points of interest, to cluster the identified moving trajectories into at least one moving section, to reflect a road correction mechanism to the at least one clustered moving section and to cluster the at least one clustered moving section into at least one moving path, and to extract one moving path, in which time sequential position information acquired by the GPS sensor is corrected, from the at least one clustered moving path; and a screen communicatively connected through the path controller and configured to display the extracted one moving path, to minimize sensing error of the GPS sensor such that the extracted one moving path is not judged as two different paths due to the sensing error of the GPS sensor, wherein the path controller is further configured to:
- identify the moving trajectories using points of interest and moving behavior information of a mobile terminal or a vehicle;
- classify moving trajectories into a plurality of trajectory classes each having a same start point and a same end point;
- detect degrees of similarity of the classified moving trajectories in the same trajectory class and primarily cluster the moving trajectories into at least one moving section cluster;
- track time sequential moving trajectories for each two arbitrary moving sections within the same moving section cluster of the primarily clustered at least one moving section cluster and extract moving paths from the primarily clustered at least one moving section cluster, the moving paths consisting of at least one moving section cluster of which sequential orders are identical; and
- secondarily cluster the extracted moving paths into secondarily clustered moving paths by using a degree of road similarity and inflection points.

9. The navigation terminal according to claim 8, wherein the moving behavior information includes walking of a user, running of the user, getting of the user into or out of a car, and getting of the user on or off a subway train, which are obtained from the mobile terminal.

10. The navigation terminal according to claim 8, wherein the path controller is further configured to select a moving section cluster having a predetermined degree of similarity to a current selected moving trajectory and to cluster the current selected moving trajectory into the selected moving section cluster.

11. The navigation terminal according to claim 10, wherein the path controller is further configured to cluster a moving trajectory of a specific moving section into the moving section cluster when the predetermined degree of similarity is smaller than a preset critical value.

12. The navigation terminal according to claim 11, wherein the path controller is further configured to set the moving trajectory of the specific moving section to a new moving section cluster when the predetermined degree of similarity is greater than the preset critical value.

13. The navigation terminal according to claim 8, wherein the path controller is further configured to set a first moving trajectory from among the moving trajectories in the same class to a first moving section cluster and then to achieve clustering by inserting the first moving section cluster into the at least one moving section cluster.

14. The navigation terminal according to claim 8, wherein the path controller is further configured to extract one moving path including the same moving trajectories from the respective secondarily clustered moving paths using road information including the respective moving paths.

* * * * *